United States Patent [19]
Farlow

[11] Patent Number: 6,088,069
[45] Date of Patent: Jul. 11, 2000

[54] SHATTER RESISTANT FLAT PANEL DISPLAY AND METHOD OF MANUFACTURING THE SAME

[75] Inventor: Terry Farlow, San Jose, Calif.

[73] Assignee: Reptron Acquisition, Inc., Tampa, Fla.

[21] Appl. No.: 08/955,397

[22] Filed: Oct. 21, 1997

Related U.S. Application Data

[60] Provisional application No. 60/028,770, Oct. 21, 1996.

[51] Int. Cl.⁷ .................. G02F 1/1335; G02F 1/1333; G09G 5/00; G02B 11/04
[52] U.S. Cl. .................. 349/12; 349/122; 345/173; 359/512
[58] Field of Search .................. 349/122, 158, 349/60, 12; 345/173, 104; 359/512, 513

[56] References Cited

U.S. PATENT DOCUMENTS

| | | |
|---|---|---|
| 4,292,370 | 9/1981 | Pekko ........................... 349/122 |
| 4,709,991 | 12/1987 | Hoshikawa ..................... 349/122 |
| 5,243,453 | 9/1993 | Kawaguchi et al. ............. 349/60 |
| 5,351,143 | 9/1994 | Sato et al. ...................... 349/12 |
| 5,710,607 | 1/1998 | Iwamoto et al. ................ 349/60 |

*Primary Examiner*—William L. Sikes
*Assistant Examiner*—Toan Ton
*Attorney, Agent, or Firm*—Gray Cary Ware & Freidenrich LLP

[57] ABSTRACT

A shatter resistant flat panel display system is provided in which the glass portion of the flat panel display system may be coated with a safety film to increase its shatter resistance. In addition, for a flat panel display system having an attached glass touch screen, the flat panel display may be protected from damage caused by the shattering of the touch screen glass and the display system may not be affected by changes in the temperature or humidity of the environment in which the display system operates.

14 Claims, 5 Drawing Sheets

SHATTER RESISTANT FLAT PANEL DISPLAY AND METHOD OF MANUFACTURING THE SAME

This application claims priority to provisional application No. 60/028,770 filed Oct. 21, 1996.

BACKGROUND OF THE INVENTION

This invention relates generally to a shatter resistant display system, and more particularly to a shatter resistant flat panel display and method for producing the same.

Flat panel liquid crystal (LCD) displays are frequently being used as computer displays to display an image of data to a user especially where there are size and weight concerns. Flat panel displays weigh less and are smaller than conventional cathode ray tube (CRT) displays. For example, a flat panel display may be used in aircraft to display important data, such as a radar map, to a pilot of the aircraft. In such applications, it is desirable to increase the resistance of the flat panel LCD to shattering and damage. A flat panel LCD typically does not have much protection from damage, and flat panel displays are expensive.

Flat panel displays may also be attached to a touch screen so that a single display system may display data to the user as well as accept input selections from the user based on the displayed data. For these display systems with a touch screen attached to the flat panel display, it is also desirable to protect the flat panel display from damage. In addition, if the touch screen, which is typically manufactured out of glass, shatters, the flat panel display may be damaged by the shards of shattered glass from the touch screen. Therefore, it is also desirable to protect the flat panel display from damage that may be caused by a shattered touch screen. Any device or method that is used to protect the flat panel display from damage, however, must have excellent optical clarity since any loss in clarity may adversely affect the brightness of the flat panel display.

The protection of the flat panel display in a display system that includes a touch screen is even more necessary since the glass used to form the touch screen is normally brittle due to the manufacturing process used to produce the touch screen. In particular, during the fabrication of the touch screen, the glass may be subjected to a high temperature processing step at approximately 425° C. which makes the glass more brittle than unprocessed glass. Due to the brittleness of the touch screen glass, the touch screen, when damaged, may explode into sharp glass shards which could easily penetrate and/or puncture the flat panel display. These sharp glass shards may also injure the user of the display system. In addition, these flat panel displays must also overcome a problem that is caused by the environment in which the flat panel displays operate.

One problem associated with the environment in which a display system with a flat panel display and a touch screen may operate, such as an aircraft cockpit, is the wide variations in temperature and humidity to which the flat panel display and the touch screen may be subjected. In particular, at the interface between the flat panel display and the touch screen, there is a small air gap which exists so that the display system is susceptible to fogging due to moisture and condensation between the flat panel display and the touch screen as the temperature and/or the humidity changes.

One conventional touch sensitive screen has a pouch attached to it and the pouch is filled with a gel. The gel helps protect the touch sensitive screen from damage. Another technique used with a convention CRT is a plastic film attached to the exterior of the CRT to protect the user of the CRT from glass shards if the CRT explodes. These conventional systems protect a touch screen from damage or the user of a CRT from damage, but do not protect a flat panel display from damage or protect a flat panel display underneath a touch screen from damage caused by the touch screen shattering. In addition, none of the conventional systems make a display system with a flat panel display and a touch screen that is insensitive to temperature and humidity changes.

Thus, there is a need for a shatter resistant flat panel display and method of manufacturing the same which avoid these and other problems of known display and methods, and it is to this end that the present invention is directed.

SUMMARY OF THE INVENTION

In accordance with the invention, a shatter resistant flat panel display and method of manufacturing the same is provided in which any glass shards, due to the shattering of a piece of glass in front the flat panel display, are retained so that the relatively unprotected flat panel display surface is not damaged by the glass shards. The invention may also retain glass shards generated when the brittle glass of a touch screen attached to the flat panel display shatters which protects the user of the display system from injury due to the glass shards, and prevents the glass shards from penetrating into the flat panel display which helps to protect the flat panel display from damage. The invention also strengthens any glass treated in accordance with the invention, so that the glass is more resistant to shattering.

The combined flat panel display and touch screen system, in accordance with the invention, is also not affected by drastic temperature and humidity changes. The protection for the flat panel display or the combined flat panel display and touch screen system in accordance with the invention, also may use inexpensive raw materials and an inexpensive manufacturing process.

In accordance with the invention, a method of manufacturing a shatter resistant display system is provided, comprising bonding a film to a back surface of a piece of glass that strengthens the glass and makes the glass shatter resistant, applying a sealing bead to a display device, and combining the piece of glass, a sealing gasket and the display device together so that the film is between said glass and said display device. The glass, gasket and display device are put together in an chamber filled with inert gas in order to form a layer of inert gas between said glass and said display device to produce a shatter resistant display system that is insensitive to temperature and humidity changes.

In accordance with another aspect of the invention, a shatter resistant display system is provided comprising a piece of glass having a film that increases the shatter resistance of the piece of glass applied to a surface of the glass, a sealing gasket attached to the piece of glass. A display device is combined with the sealing gasket and the piece of glass in a inert gas chamber so that a layer of the inert gas is trapped between the piece of glass and the display device to form a shatter resistant display system that is insensitive to temperature and humidity changes.

The invention may be used to create a video interface package comprising a touch screen and a flat panel display that is shatter resistant and free from entrapped air/moisture which could cause condensation and resulting visibility problems under varying ambient pressure and temperature conditions.

DETAILED DESCRIPTION OF THE PREFERRED EMBODIMENT

The invention is particularly applicable to forming a shatter resistant display system that includes a flat panel display and a touch screen. It is in this context that the invention will be described. It will be appreciated, however, that the system and method in accordance with the invention has greater utility such as for protecting a flat panel display from damage. Before describing the preferred embodiments of the invention, a brief description of a conventional display system including a flat panel display and a touch screen will be provided.

Figure 1:
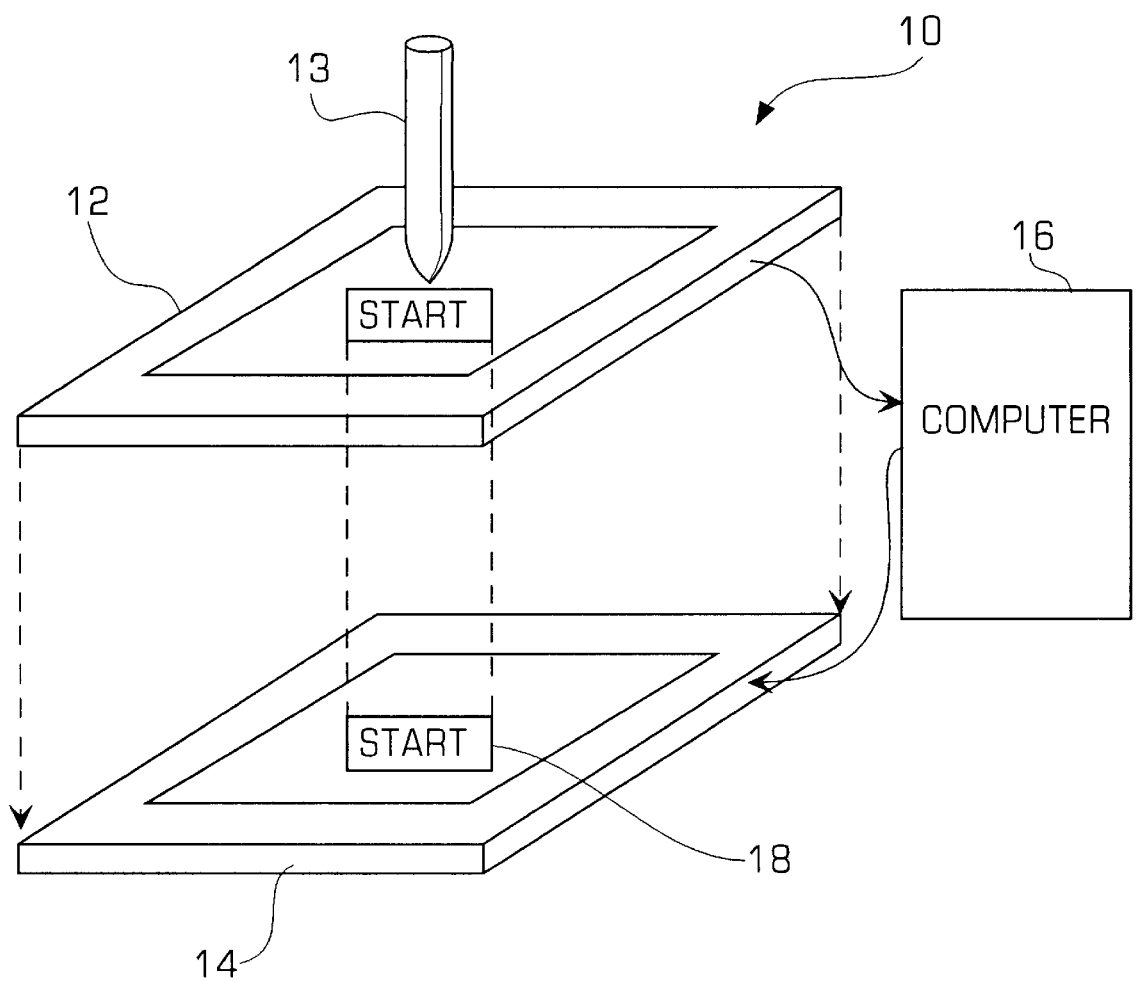
FIG. 1 illustrates an assembly diagram of a conventional display system that includes a touch screen and a flat panel display.

FIG. 1 illustrates a conventional display system 10 that includes a touch screen 12 and a flat panel liquid crystal display device 14, that may be a conventional liquid crystal display device. The touch screen may be a piece of optically clear glass that has electronic circuitry embedded within the glass so that a computer 16 connected to the touch screen may determine what point on the screen is being selected by a user. If severely impacted, the touch screen glass may break into flying glass fragments due to the brittleness of the glass in the touch screen. The flat panel display device 14 produces an image in response to commands from a computer 16 to display an image to the user. For example, the computer, in this example, has commanded the flat panel display 14 to display a button 18 with the word "start" inside the box. The user of the system views this box through the touch screen as shown. If the user wants to select the button, the user may touch the location of the button 18 on the display system with a stylus 13 or his finger and the touch screen determines that the user may selected the START button based on the location on the display that is selected by the user. Thus, the display system displays data to a user as well as permitting the user to select data or commands that are displayed on the flat panel display. Now, a shatter resistant display system in accordance with the invention and a method for manufacturing the same will be described.

Figure 2:
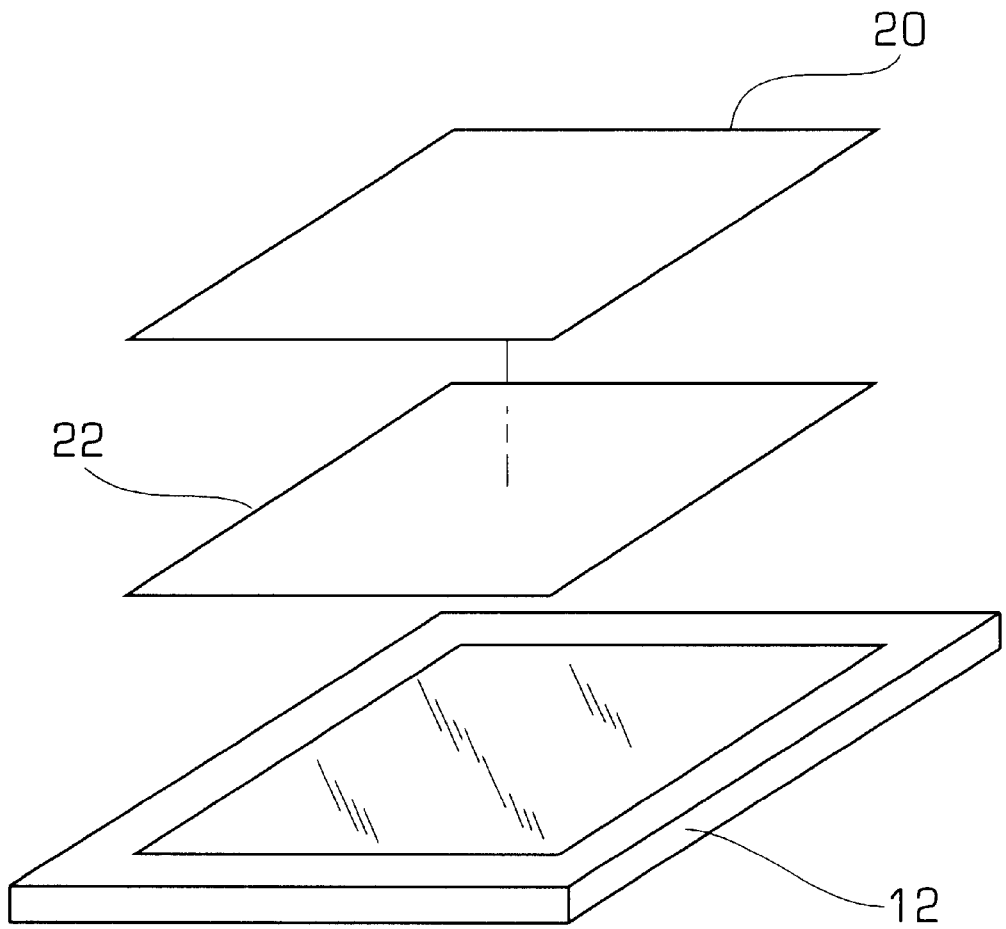
FIG. 2 illustrates a shatter resistant touch screen assembly and method of forming the same in accordance with the invention.

FIG. 2 is a diagram illustrating a touch screen 12 that may have a safety film 20 bonded to a back surface of the touch screen in accordance with the invention. In another embodiment described below with reference to FIG. 6, a layer of safety film may also be applied to both surfaces of the touch screen in accordance with the invention. In addition, in accordance with the invention, a safety film may be applied to one or both surfaces of a planar sheet of glass (not shown) that may be used to protect the display surface of a flat panel display. The safety film 20 may be an optically clear, polyester, ultraviolet inhibiting film which may have a thickness of between 2 to 12 millimeters (mm) and preferably a thickness of between 4 to 11 mm depending on the application requirements. The safety film provides added strength to the glass and retains any shards of the glass in the event that the glass shatters. The safety film may include an adhesive, such as a pressure sensitive adhesive (PSA), that is bonded to the glass. The safety film may have a light transmission value of between about 80 and 95 percent and preferably about 95 percent. Any other type of safety film which provides the necessary optical clarity and the necessary strength to the glass may also be used in accordance with the invention. The safety film may also have a protective cover of film that is applied to it then stamped out to prevent the edges of the film from lifting up when the film is applied to the touch screen. The safety film may absorb shock applied to the glass that would otherwise possibly damage the glass, may strengthen the glass and may retain any glass fragments or shards if the glass is shattered.

When the safety film is applied to the touch screen, adhesive tape on the safety film may be used to remove the protective cover of film from the top surface and bottom surface of the safety film. Next, a wetting solution 22 of water and mild soap (about 1 cc to 3 cc to each quart of water being preferred) is used to form a uniform coating that is applied on the touch screen and the adhesive side of the safety film. The wetting solution helps break down the adhesive to produce a good bond between the safety film and the touch screen. The water in the wetting solution may preferably be purified, filtered water, but may also be ordinary tap water. Once the wetting solution has been applied to the safety film, the safety film and the touch screen are pressed together while applying additional solution to the surface of the touch screen. Next, the touch screen or the piece of glass may be placed in a heated chamber, that may preferably be about 40° C., for at least twenty-four hours, and preferably about forty-eight (48) hours, to remove any moisture and to cure the adhesive. The processing of the touch screen and the safety film has been completed. Now, the preparation of the flat panel display in accordance with the invention will be described.

Figure 3:
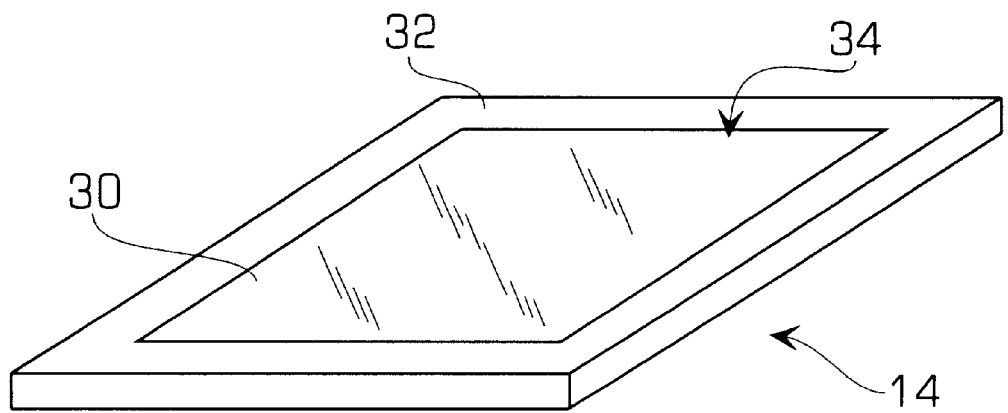
FIG. 3 illustrates a flat panel display and a method of sealing the flat panel display to its housing.

FIG. 3 is a diagram illustrating the flat panel display device 14 being prepared for attachment to the touch screen shown in FIG. 2. The flat panel display device may comprise an active area 30 surrounded by a metal frame or housing 32. In a typical fat panel display, the metal housing is merely clipped to the active area 30. In accordance with the invention, the flat panel display device must be sealed to prevent any moisture from entering into the active area of the flat panel display device. This sealing may be accomplished by applying a bead of sealing material 34, that may be between 25 and 35 mm thick and may preferably be about 2.5 mms thick, between the metal housing and the flat panel display device. Preferably, a pure silicon bead may be used that is approximately 100% pure. The flat panel display device and the bead may then be placed into a heated chamber, that may be about 40° C., for about eight (8) hours in order to cure the bead. Now, the process of preparing a sealing gasket in accordance with the invention will be described with reference to FIG. 4.

Figure 4:
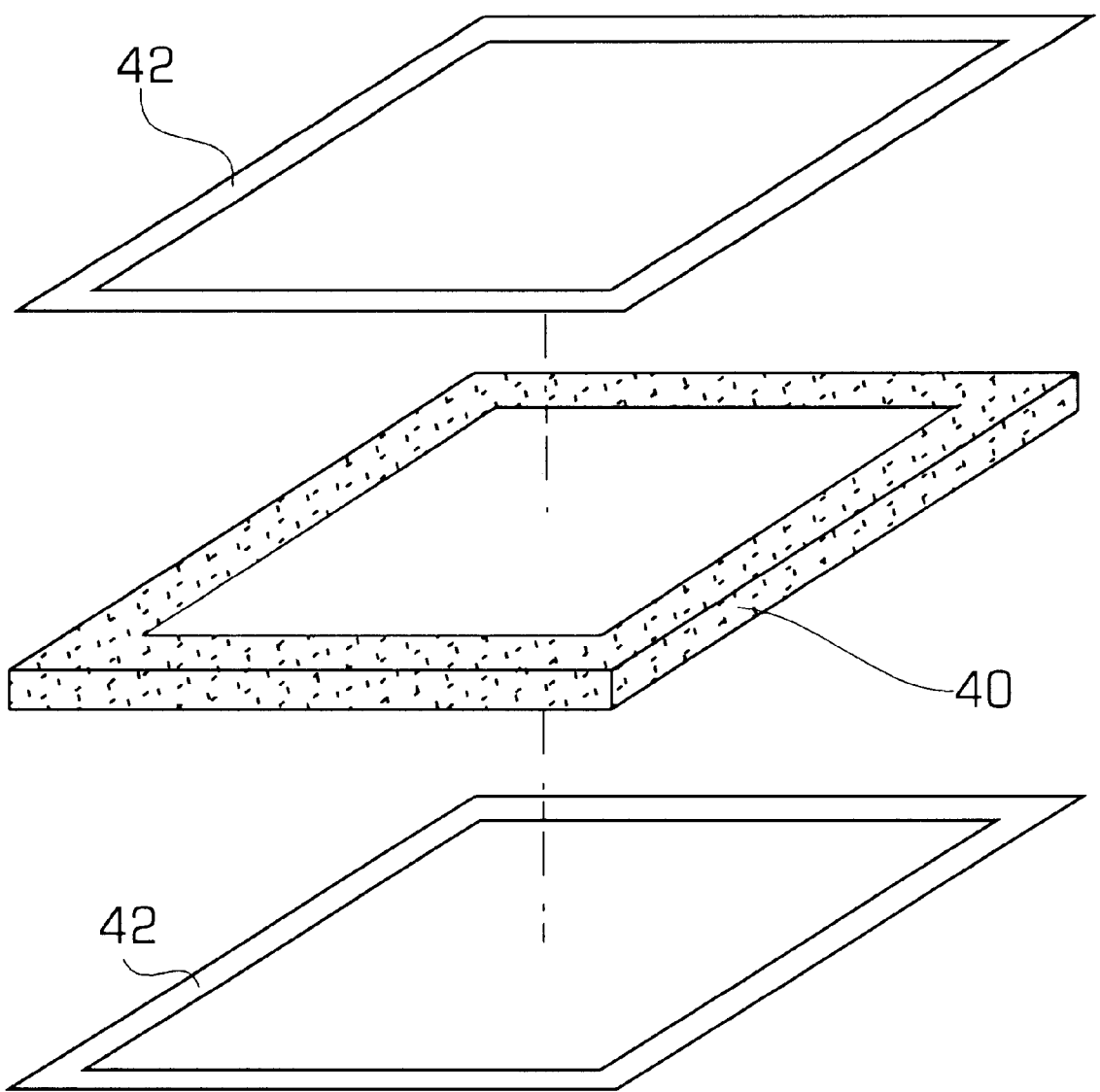
FIG. 4 illustrates the construction of a sealing gasket for providing a sealed region between the touch screen and the flat panel display.

FIG. 4 is a diagram of a sealing gasket 40 that is being prepared to be incorporated into a shatter resistant flat panel display system in accordance with the invention. The sealing gasket 40, which is preferably non-porous and comprised of a closed cell silicon with an adhesive layer 42 applied to each side of the gasket, is used to attach the touch screen to the flat panel display and prevents an inert gas, sealed in between the flat panel display and the touch screen, from escaping. The closed cell gasket 40 is preferably a combination of poron and silicone. The adhesive is preferably a silicone/acrylic double film closed cell coated tape which is applied to both sides of the gasket 40. Now, with reference to FIG. 5, a final step to manufacture a shatter resistant display system in accordance with the invention will be described in which the touch screen is attached to the flat panel display device.

Figure 5:
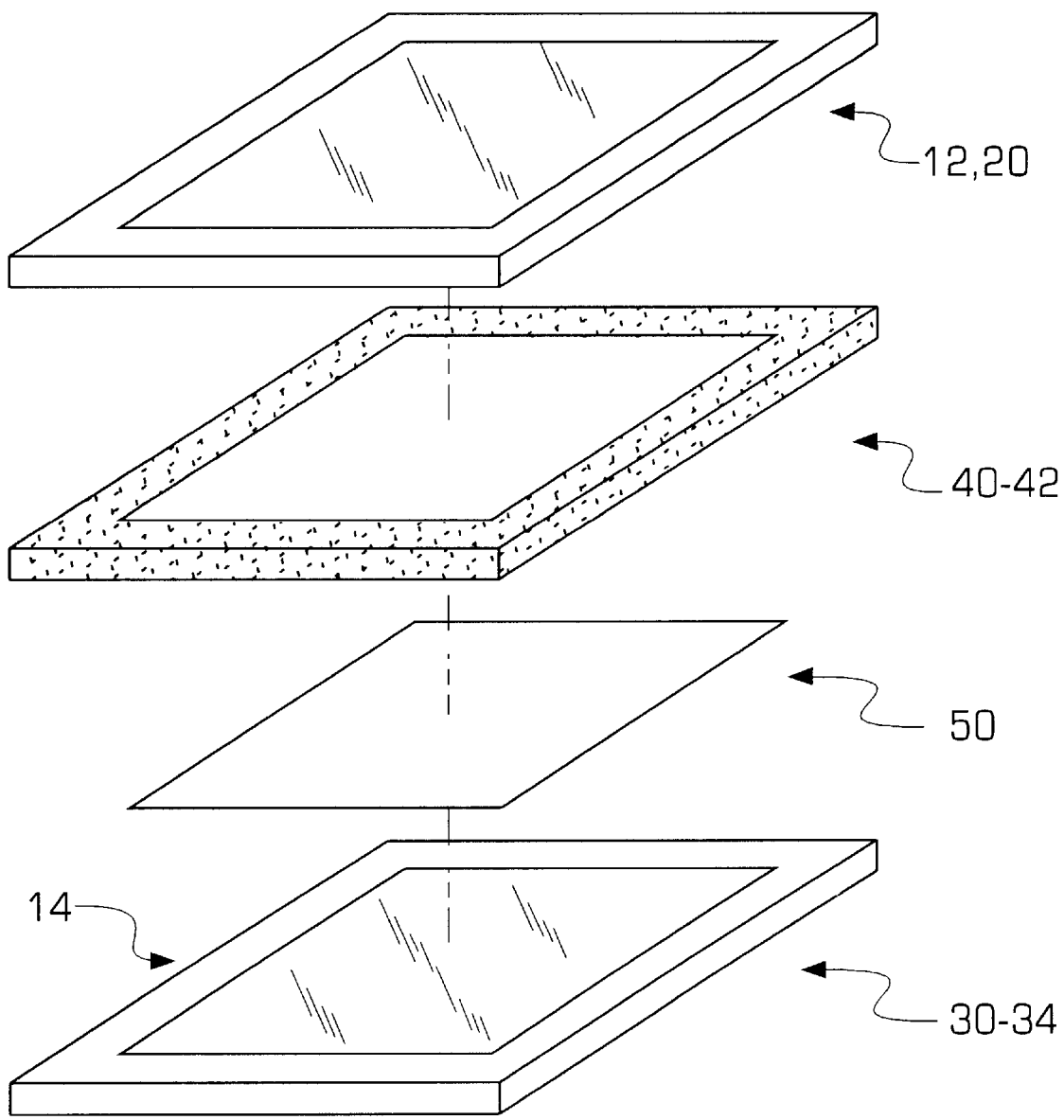
FIG. 5 illustrates the touch screen and flat panel display, being assembled together in accordance with the invention.

FIG. 5 illustrates the final assembly process for the shatter resistant flat panel display device in accordance with the invention. The final assembly process may be carried out in a sealed chamber filled with an inert gas. The inert gas may preferably be nitrogen but may also be any other inert gas. The assembly of the flat panel display device and the touch screen in the nitrogen chamber creates a nitrogen gas layer 50 between the touch screen 12 and the flat panel display device 14. This process eliminates a majority of the air and moisture between the touch screen and flat panel display device since air and moisture between the touch screen and the flat panel display device may cause condensation and resulting visibility problems under widely varying ambient pressure and temperature conditions where the video display is used. Preferably, the amount of air and moisture between the touch screen and the flat panel display is reduced to less than 0.5%. The gasket 40 may be attached to the flat panel display device 14 and then the touch screen 12 is pressed onto the flat panel display device and the gasket which creates a completed display device that has a nitrogen gas layer in between the touch screen and the flat panel display device.

The safety film attached to the touch screen, in accordance with the invention, may strengthen the glass of the touch screen, requiring approximately 2–3 times the impact force to break an equivalent screen without the above-described safety film bonding process. In the event of an impact of sufficient force to break the glass of the touch screen, the glass shards are held together by the safety film laminate, accomplishing, for example, prevention of personal injury, and prevention of damage to the flat panel video display (FPD) mounted behind the touch screen. The safety film laminate also resists penetration of glass to prevent penetration of the flat panel display device and the laminate material also absorbs some of the energy of any impact. Now, an embodiment in which the safety film is applied to both surfaces of a planar sheet of glass, such as a touch screen, will be described with reference to FIG. 6.

Figure 6:
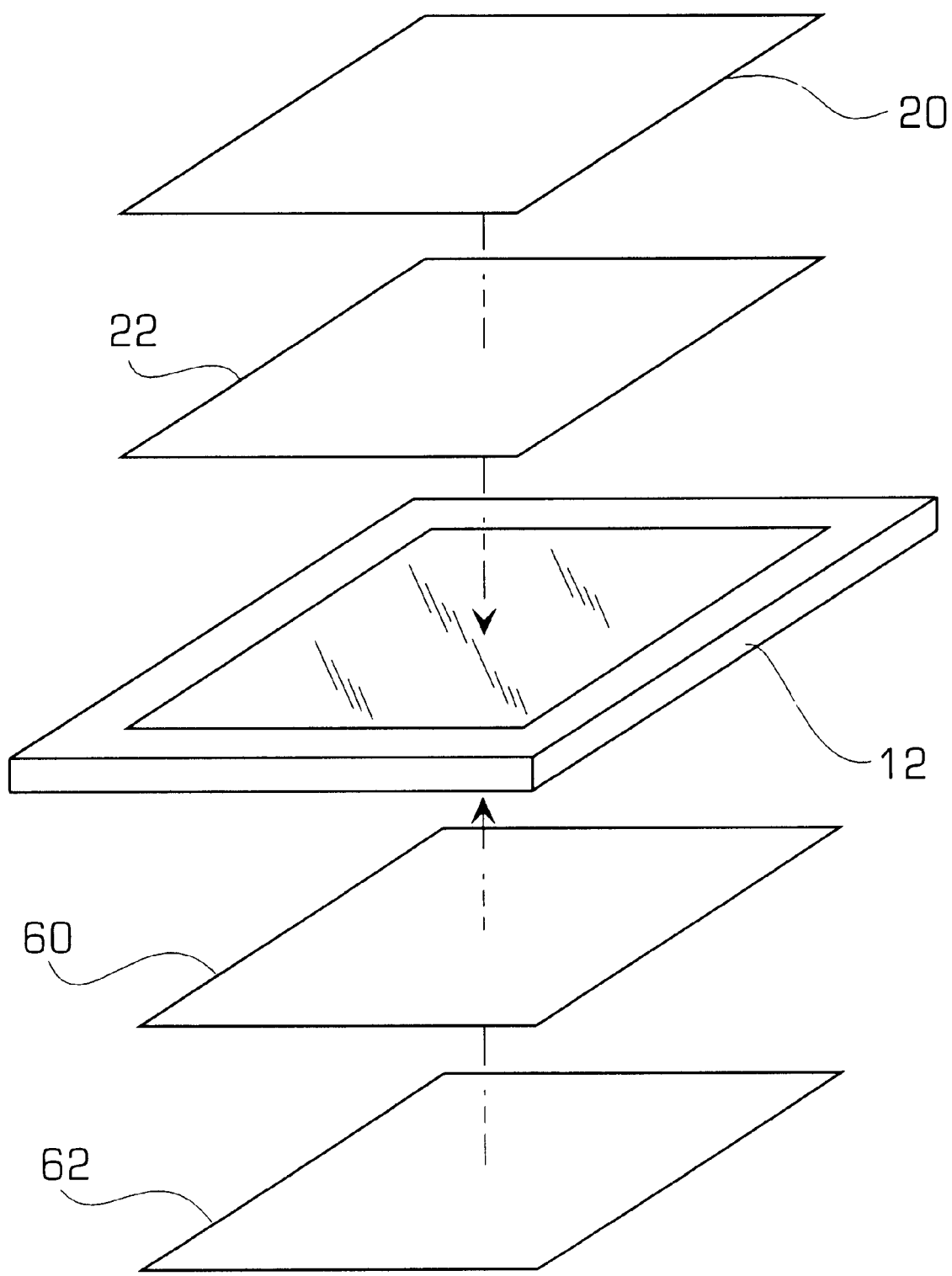
FIG. 6 illustrates a shatter resistant film layer being applied to both surfaces of a piece of glass, such as a touch screen in accordance with the invention.

FIG. 6 is a diagram illustrating a first layer of safety film 20, as described above, being applied to a first surface of a touch screen 12 and a second layer of safety film 62 being applied to a second surface of the touch screen 12 in accordance with the invention. Both layers of the safety film are applied and bonded to the touch screen by a wetting solution 22, 60. In addition, in accordance with the invention, the safety film may be applied to both surfaces of a planar sheet of glass that may be attached to a conventional flat panel liquid crystal display device to protect the flat panel display device from damage due to impact forces and static forces.

Compared to other methods, such as the use of an optically clear "gel" as an interface between a touch screen and a FPD, the invention adds negligible weight to a display device while providing significant benefits, particularly in aircraft or other weight-sensitive applications and maintaining desired optical clarity levels for excellent picture quality. In addition, the process of dispersing the ambient air by assembling the touch screen and flat panel display device together in a nitrogen-filled chamber in accordance with the invention, as described above, reduces the amount of air and moisture between the touch screen and the flat panel display to approximately less than 0.5% and eliminates any potential humidity/condensation problems, such as fogging, due to changing ambient conditions. The invention in accordance with the invention, in the event of an impact severe enough to break or shatter the sheet of glass or the touch screen, will keep the glass shards attached to the safety film in order to accomplish, for example, preventing the personal injury of the user of the display system, and preventing damage to the flat panel display device underneath the touch screen or piece of glass. Now, the tests indicating the efficacy of the invention will be described.

In a first test, a first display device in accordance with the invention, having a 8.4" diagonal capacitive touch screen mounted/affixed to an 8.4" diagonal piece of glass, which simulated a flat panel display device by using a 1/32" thick piece of glass. A double-sided adhesive sealing gasket is between the glass and the touch screen. A second conventional display device without the safety film process in accordance with the invention, was tested to compare the results of impact forces on the display device in accordance with the invention and a conventional display device.

The two test display units, described above, were tested at test facilities by qualified personnel under the supervision of and with the assistance of RES personnel. RES is an agency which is an approved, independent test lab which certifies products to Mechanical and Electrical Agency requirements (UL, CSA, TUV, CE, etc.).

In the first test, a two inch (2") diameter stainless steel ball, weighing 1.125 lbs., was dropped on the approximate center of the operating face of the touch screen, for each display device. The ball was dropped from a plurality of successively increasing heights, with three distinct drops from each height, until the display device either broke or survived three drops from 52" above the touch screen. The data generated during this test is set forth in Tables 1 and 2 below.

TABLE 1

8.4" Display Device in Accordance with the Invention

| Drop Height (in Inches) | Number of Drops | Result |
| --- | --- | --- |
| 2 | 3 | No Breakage |
| 4 | 3 | No Breakage |
| 6 | 3 | No Breakage |
| 8 | 3 | No Breakage |
| 10 | 3 | No Breakage |
| 12 | 3 | No Breakage |
| 14 | 3 | No Breakage |
| 16 | 3 | No Breakage |
| 18 | 3 | No Breakage |
| 20 | 3 | No Breakage |
| 22 | 3 | No Breakage |
| 24 | 3 | No Breakage |
| 26 | 3 | No Breakage |
| 28 | 3 | No Breakage |
| 30 | 3 | No Breakage |
| 32 | 3 | No Breakage |
| 34 | 3 | No Breakage |
| 36 | 3 | No Breakage |
| 39 | 3 | No Breakage |
| 45 | 3 | No Breakage |
| 52 | 3 | No Breakage |
| Total Consecutive Drops | 63 | No Breakage |

TABLE 2

| 8.4" Conventional Display Device | | |
| --- | --- | --- |
| Drop Height (in Inches) | Number of Drops | Results |
| 12 | 3 | No breakage |
| 24 | 1 | The display shattered. |
| Total Drops | 4 | Shattered |

As shown by these tests, the display device in accordance with the invention, withstood 63 repeated strikes by the ball, from heights of up to 52", and did not shatter. By contrast, the conventional display device shattered when the ball was dropped from only 24". Thus, the display device in accordance with the invention, is much more resistant to shattering from an impact force. Now, a second test in which the display device in accordance with the invention was subjected to a static force will be described.

In a static load test, a seventy-five pound weight was placed on a ¾" square pedestal at the center of a rectangular piece of glass with the safety film that measured 14" in the diagonal direction. The glass, which simulates the touch screen, was coated with the safety film in accordance with the invention and the glass was 125 mms thick. The weight was left on the glass for a period of seven days. The glass deflected downwards somewhat, but never broke or fractured. Thus, the invention in accordance with the invention is also resistant to static loads.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. A method of manufacturing a shatter resistant display system, comprising:

bonding a film to a surface of glass to strengthen and impart shatter resistance to the glass;

applying a sealing bead to a display device to seal the display device; and combining the glass, a sealing gasket and the display device together so that the film is between said glass and said display device, the glass, gasket and display device being combined together in a chamber filled with an inert gas in order to form a layer of inert gas between said glass and said display device to produce a shatter resistant display system that is insensitive to temperature and humidity changes.

2. The method of claim 1, wherein said bonding comprises bonding a film to both of the surfaces of the glass.

3. The method of claim 1, wherein said inert gas comprises nitrogen.

4. The method of claim 1, wherein said display device comprises a flat panel liquid crystal display device.

5. The method of claim 1, wherein said glass comprises a touch screen.

6. The method of claim 1, wherein said film is between about 2 to 14 mils thick.

7. The method of claim 6, wherein said film comprises a polyester film that inhibits UV rays and has a light transmission value of between about 80 to 95 percent.

8. A shatter resistant display system, comprising:

a planar sheet of glass;

a film applied to a surface of the glass to increase a shatter resistance of a piece of the glass;

a sealing gasket attached to the planar sheet of glass; and a display device being combined with the sealing gasket and the planar sheet of glass with a layer of an inert gas trapped between the piece of glass and the display device to form a shatter resistant display system that is insensitive to temperature and humidity changes.

9. The display system of claim 8, wherein said film further comprises a film applied to both of the surfaces of the planar sheet of glass.

10. The display system of claim 8, wherein said inert gas comprises nitrogen gas.

11. The display system of claim 8, wherein said display device comprises a flat panel liquid crystal display device.

12. The display system of claim 8, wherein said glass comprises a touch screen.

13. The display system of claim 8, wherein said film comprises a polyester film that is between about 2 and 14 mils thick.

14. The display system of claim 13, wherein said film comprises a polyester film that inhibits UV rays and has a transmission value of between about 80 and 95 percent.

* * * * *